(12) United States Patent
Koele et al.

(10) Patent No.: US 9,217,224 B2
(45) Date of Patent: Dec. 22, 2015

(54) PRINT HEAD ARRANGEMENT AND METHOD OF DEPOSITING A SUBSTANCE

(71) Applicant: XENNIA HOLLAND B.V.

(72) Inventors: Gerrit Koele, Diepenheim (NL); Alan Hudd, Bourn (GB)

(73) Assignee: XENNIA HOLLAND B.V., Nijverdal (NL)

( * ) Notice: Subject to any disclaimer, the term of this patent is extended or adjusted under 35 U.S.C. 154(b) by 0 days.

(21) Appl. No.: 14/029,814

(22) Filed: Sep. 18, 2013

(65) Prior Publication Data

US 2014/0011005 A1 Jan. 9, 2014

Related U.S. Application Data

(60) Division of application No. 12/769,701, filed on Apr. 29, 2010, now Pat. No. 8,557,340, which is a continuation of application No. PCT/EP2008/064838, filed on Oct. 31, 2008.

(30) Foreign Application Priority Data

Oct. 31, 2007 (EP) ..................................... 07119807

(51) Int. Cl.
*B41J 15/08* (2006.01)
*B41J 15/00* (2006.01)
(Continued)

(52) U.S. Cl.
CPC .............. *D06M 23/16* (2013.01); *B41J 2/2132* (2013.01); *B41J 3/4078* (2013.01); *B41J 3/543* (2013.01);
(Continued)

(58) Field of Classification Search
CPC ............ B41J 11/26; B41J 11/27; B41J 11/28; B41J 11/30; B41J 11/36; B41J 11/42; B41J 11/44; B41J 15/00; B41J 15/046; B41J 15/048; B41J 15/08; B41J 15/10; B41J 15/12; B41J 15/14; B41J 2/505; B41J 3/54; B41J 25/001; B41J 25/003; B41J 15/008; B41J 2/2132; B41J 2/2135; B41J 2/5056; B41J 2/512; B41J 3/4078; B41J 3/543; B41J 11/0095; B41J 11/46; B41J 19/16; D06P 5/30; G06K 15/107
USPC ......................... 347/4, 5, 9–14, 101, 104, 105
See application file for complete search history.

(56) References Cited

U.S. PATENT DOCUMENTS 4,864,328 A 9/1989 Fischbeck
4,907,013 A 3/1990 Hubbard et al.
(Continued)

FOREIGN PATENT DOCUMENTS

EP 0571804 A2 12/1993
EP 0829368 A2 3/1998
(Continued)

OTHER PUBLICATIONS

MachineTranslationof-JP10-315541(1998), Uei et al., 1998.*
Uei, MachineTranslationof-JP-10315541(1998), 1998.*

*Primary Examiner* — Geoffrey Mruk
*Assistant Examiner* — Scott A Richmond
(74) *Attorney, Agent, or Firm* — Hoyng Rokh Monegier LLP; Minerva Rivero; David P. Owen

(57) ABSTRACT

A system for depositing a substance onto a substrate comprises continuously transporting the substrate in a transport direction while traversing a deposition arrangement across the substrate to deposit the substance in a number of swathes. During such movement the positions of the deposition arrangement and the substrate are controlled with respect to one another such that the swathes complement one another to provide substantially uniform coverage of the substrate. As a result of the defined arrangement, improved substrate speeds can be achieved since there is no need for the substrate to stop at each traverse.

10 Claims, 6 Drawing Sheets

(51) Int. Cl.
  *D06M 23/16* (2006.01)
  *B41J 2/21* (2006.01)
  *B41J 3/407* (2006.01)
  *B41J 3/54* (2006.01)
  *B41J 11/00* (2006.01)
  *B41J 11/46* (2006.01)
  *B41J 19/16* (2006.01)
  *G06K 15/10* (2006.01)
  *D06P 5/30* (2006.01)

(52) U.S. Cl.
  CPC ............. *B41J 11/0095* (2013.01); *B41J 11/46* (2013.01); *B41J 19/16* (2013.01); *G06K 15/107* (2013.01); *D06P 5/30* (2013.01); *Y10T 428/2481* (2015.01); *Y10T 428/24802* (2015.01); *Y10T 442/20* (2015.04); *Y10T 442/2164* (2015.04); *Y10T 442/2262* (2015.04); *Y10T 442/2279* (2015.04); *Y10T 442/2352* (2015.04); *Y10T 442/2361* (2015.04); *Y10T 442/2377* (2015.04); *Y10T 442/241* (2015.04); *Y10T 442/2418* (2015.04); *Y10T 442/259* (2015.04); *Y10T 442/2525* (2015.04); *Y10T 442/2582* (2015.04); *Y10T 442/2631* (2015.04); *Y10T 442/273* (2015.04); *Y10T 442/2738* (2015.04)

(56) References Cited

U.S. PATENT DOCUMENTS

| | | |
|---|---|---|
| 4,963,882 A | 10/1990 | Hickman |
| 4,977,410 A | 12/1990 | Onuki et al. |
| 5,450,099 A | 9/1995 | Stephenson et al. |
| 5,581,284 A | 12/1996 | Hermanson |
| 5,587,730 A | 12/1996 | Karz |
| 5,640,183 A | 6/1997 | Hackleman |
| 5,747,105 A | 5/1998 | Haubert |
| 5,838,343 A | 11/1998 | Chapin et al. |
| 6,106,102 A | 8/2000 | Richtsmeier et al. |
| 6,116,728 A | 9/2000 | Miyake et al. |
| 6,439,786 B1 | 8/2002 | Hasiuk |
| 6,593,953 B1 * | 7/2003 | Ross et al. ............. 347/221 |
| 6,918,651 B2 * | 7/2005 | Menendez et al. ........ 347/37 |
| 7,112,621 B2 | 9/2006 | Rohrbaugh et al. |
| 2002/0089560 A1 * | 7/2002 | Katayama et al. ........ 347/16 |
| 2006/0292291 A1 | 12/2006 | White et al. |
| 2007/0024667 A1 * | 2/2007 | Kim ....................... 347/41 |
| 2007/0231044 A1 * | 10/2007 | Koga et al. ............. 400/625 |

FOREIGN PATENT DOCUMENTS

| | | | |
|---|---|---|---|
| EP | 0829368 A3 | | 9/1999 |
| EP | 1573109 B1 | | 11/2006 |
| GB | 2373217 A | | 9/2002 |
| GB | 2387816 A | | 9/2008 |
| JP | 1075247 | | 9/1987 |
| JP | 5301340 A | | 11/1993 |
| JP | 10315541 | | 12/1998 |
| JP | 10315541 A | * | 12/1998 |
| JP | 200110030 A | | 1/2001 |
| JP | 2004148737 A | | 5/2004 |
| JP | 2004338215 | | 12/2004 |
| JP | 2004351677 | | 12/2004 |
| JP | 2005186419 A | | 7/2005 |
| WO | 2006/060644 A | | 6/2006 |
| WO | 2006060967 A | | 6/2006 |
| WO | 2006/100273 A | | 9/2006 |
| WO | 2006/100275 A | | 9/2006 |
| WO | WO 2006100273 A1 | * | 9/2006 |
| WO | 2007/147175 A2 | | 1/2007 |

* cited by examiner

PRINT HEAD ARRANGEMENT AND METHOD OF DEPOSITING A SUBSTANCE

CROSS REFERENCE TO RELATED APPLICATIONS

This application is a divisional of U.S. patent application Ser. No. 12/769,701 filed on 29 Apr. 2010, which is a continuation of PCT application number PCT/EP2008/064838, filed on Oct. 31, 2008, and which claims priority from EP application number 07119807.1 filed on Oct. 31, 2007. The contents of all applications are hereby incorporated by reference in their entirety.

BACKGROUND OF THE INVENTION

1. Field of the Invention

The invention relates generally to the deposition of a substance onto a substrate using printing techniques and the like. The invention further relates to improved equipment and procedures for performing such deposition in a continuous process and has particular application in the fields of textile printing and finishing.

2. Description of the Related Art

Systems for inkjet printing of images and text onto a substrate are generally known. Many such systems are adapted to desktop or office application and are well suited for performing printing onto A3 or A4 sized paper or the like. For wider substrates, more specialized machinery is required, in particular when high speed is important. For such applications, inkjet printing techniques may be used but lithographic and conventional printing techniques are still generally favoured.

For textiles, inkjet printing techniques have also recently been developed as an alternative to traditional printing, dyeing and coating techniques. These techniques are generally distinct from those used in the graphics field, due to material and dyestuff considerations. Attempts have also been made to adapt inkjet deposition techniques for textile upgrading and finishing procedures. A characteristic of these processes is often that they require considerable volumes of product to be deposited across the whole textile surface. In many situations, the uniformity of the deposition or coating is of paramount importance as the quality of the fabric depends upon it. This uniformity may be important from a visual perspective (absence of streaks or blemishes) and also from a functional perspective (waterproofing or flame retardancy).

There are currently two main system configurations used for inkjet printing: fixed array systems and scan and step arrangements. Both are mainly used with drop on demand (DoD) techniques but may also be used with continuous inkjet (CIJ) techniques.

Fixed array systems allow printing of a continuously moving substrate at relatively high production speeds. A fixed array of print heads is arranged across the width of the substrate and the nozzles are activated to deposit material as required onto the substrate which is in continuous motion below the print head array. Typically fixed array systems are used for narrow width substrates on continuous reel to reel web systems, as only a few print heads are required to cover the width of the substrate. The use of fixed array inkjet procedures for textile finishing is described in European Patent EP-B-1573109.

Fixed array systems have a number of drawbacks, mainly related to the low flexibility and lack of redundancy in such a printing system. When printing onto a wide substrate with a fixed array system, a large number of print heads are required to straddle the width of the substrate, leading to a high capital cost for the printing system. If the required substrate speed is below the maximum speed of the print head (e.g. due to other slower processes), then this extra system capacity cannot be usefully exploited and is wasted i.e. at anything below maximum speed, the printing system is making inefficient use of the print heads present. The resolution across the substrate width is fixed by the position of the print head nozzles and cannot therefore be readily varied. When maintenance of a print head is required, the substrate must stop and the array must be moved away from the substrate to allow access to the print heads. This is often a relatively complex operation and the downtime associated therewith can be costly. In the event that a nozzle fails during printing, a single vertical line appears on the substrate, which is a particularly visible mode of failure and represents a complete 100% failure to deposit material in the localized area. Printing a continuous image also requires a complex continuous data handling system. The system must continuously feed data to the print head nozzles, to maintain the image continuously printing on the substrate and there is no obvious break point (or time) where memory can be reloaded. This means that many fixed array printing systems have a repeat length dependant on their memory capacity, after which the image is simply repeated. This situation can be avoided by using dynamic memory handling where data is fed into memory as fast as it is fed out to the print heads but this requires a significantly more complicated memory management system.

Scan and step arrangements operate to scan a print head carriage across the width of a stationary substrate to print a horizontal band or swathe. The substrate is then precisely incremented forwards, before the print head carriage makes another pass across the stationary substrate to print a second swathe. Such systems are typically used for printing onto wide substrates of up to 5 m where a fixed array would be impractical. They are also used in applications where lower productivity is acceptable i.e. wide format commercial graphic arts printing.

Scan and step systems also have a number of drawbacks, mainly focused on the low productivity and the stepping nature of the substrate motion. In particular, the stepping of the substrate means that such a system has poor compatibility when used as a component or process within a continuous production line. The time taken to increment or step the substrate cannot be used for printing and limits productivity. The stepping motion also means that the substrate must be rapidly accelerated and decelerated, which requires powerful motors and a high level of control when dealing with wide substrates on heavy rollers. The stepping motion must also occur with high accuracy and repeatability, as this motion affects the down web resolution and thus the quantity of material deposited (for functional applications) or the image quality (for imaging applications).

All of these drawbacks have hitherto made continuous, high-speed and highly uniform deposition onto wide substrates difficult to achieve. In particular, the reliability of print heads for such operations is still far from optimal. A DoD nozzle requires continuous preventative maintenance in order to keep it functioning correctly, which is a key element in system design. If the nozzle is not used for a period it will block and not fire when subsequently required. For scan and step systems, the scanning motion of the print heads allows the turn around time at the end of each pass to be available for regular maintenance of the print heads. This may involve the cleaning of each jet or nozzle to prevent blockage and/or spitting of ink from idle nozzles. Nevertheless, the maintenance time comes at the expense of intermittent motion of the substrate. This can be a cause of additional indexing faults and wear in the drive train. Furthermore, the rapid acceleration of the print cartridge at each traverse is a potential source of mechanical failure and a design limitation.

In an array configuration, regular maintenance opportunities are not available. There have been many attempts in the inkjet industry to compensate for missing nozzles or malfunctioning nozzles. U.S. Pat. No. 4,907,013 discloses circuitry for detecting a malfunctioning nozzle in an array of nozzles in the inkjet print head. If the printer processor is unable to compensate for the malfunctioning nozzle by stepping the print head and using non-malfunctioning nozzles during subsequent passes over the print medium, the printer is shut down. U.S. Pat. No. 4,963,882 discloses using multiple nozzles per pixel location. In one embodiment, two ink droplets of the same colour are deposited upon a single pixel location from two different nozzles during two passes of the print head. U.S. Pat. No. 5,581,284 discloses a method for identifying any failed nozzle in a full width array print bar of a multicolour printer and substituting at least one droplet from a nozzle in another print bar having a different colour of ink. U.S. Pat. No. 5,640,183 discloses a number of droplet ejecting nozzles are added to the standard column of nozzles in a nozzle array, so that a number of redundant nozzles are added at the ends of each column of nozzles. The print head is shifted regularly or pseudo-randomly such that a different set of nozzles prints over the first printed swathe during a subsequent pass of the print head in a multi-pass printing system. U.S. Pat. No. 5,587,730 discloses a thermal inkjet printing apparatus having a redundant printing capability including a primary print head and a secondary print head. In one mode, if the primary print head fails, the secondary print head prints ink drops of the first colour in place of the primary print head. Despite all of these attempts, a suitable solution for high uniformity, fault-free deposition remains to be found that can operate continuously at high speeds over large widths.

BRIEF SUMMARY OF THE INVENTION

The present invention addresses these problems by providing an alternative method of depositing a substance onto a continuous supply of substrate. In this context, "continuous" is understood to mean that the substrate does not move in a stepwise manner and the feed of substrate to the printing arrangement does not stop during the normal course of the process. Nevertheless, the speed of the substrate may vary or fluctuate within normal tolerances and as required by the particular process. Accordingly the method comprises continuously transporting the substrate in a transport direction while traversing a deposition arrangement across the substrate to deposit the substance in a number of swathes. During such movement the positions of the deposition arrangement and the substrate are controlled with respect to one another such that the swathes complement one another to provide substantially uniform coverage of the substrate. As a result of the defined arrangement, improved substrate speeds can be achieved since there is no need for the substrate to stop at each traverse. In the context of the present invention, it is important to note that uniform coverage of the substrate is intended to refer to the ability to address all areas of the substrate where deposition is intended. It is thus not necessary that actual deposition takes place at all positions. Printing of an image or pattern may require selective deposition, while application of a coating may require substantially complete coverage. It is also not a requirement that the totality of the substrate receives the uniform coverage. There may thus remain uncovered edge regions where deposition of the substance is not intended. Preferably the method is performed at substrate speeds of at least 5 m/min, preferably 10 m/min and more preferably above 20 m/min.

The principle of the invention may be applicable in cases where the substance is deposited by contact between the substrate and deposition arrangement. Preferably however, the deposition arrangement comprises a contactless head and deposition takes place by projecting the substance onto the substrate from a distance. In this manner, the relative movement between the substrate and the head may affect less the resulting product. Any known contactless head may be employed including inkjet, sprays, nozzles and the like. Furthermore, although under most circumstances deposition will take place directly onto the final substrate, the present invention is also intended to cover indirect deposition e.g. onto a transfer reel or medium, which is subsequently applied to the substrate.

According to a particularly important aspect of the invention, the method may comprise pausing at least part of the deposition arrangement after each traverse while continuing to transport the substrate. In this context, pausing is intended to mean that normal printing onto the substrate temporarily ceases. The deposition arrangement does not have to halt, although in reciprocating arrangements its speed will at least momentarily drop to zero prior to commencing a return traverse. The fact that the deposition arrangement can move independently from the continuous motion of the substrate enables this pause to occur and also means that the turn-around time of the deposition arrangement can be increased. Having a longer turnaround time can be used to reduce the acceleration forces applied to the deposition arrangement and any beam or frame that supports it. This may reduce wear and maintenance costs and also require smaller drive motors and lower energy. The pause may be achieved in various different manners as explained in further detail below.

A primary advantage of such a pause is that it allows maintenance on the deposition arrangement to be performed during the pause. Certain types of head require routine maintenance after each or a number of traverses. In the case of a DoD print head, this may require firing of each nozzle to ensure that no clogging or encrustation occurs. Other heads may require alternative treatment. Performance of such maintenance allows a high quality result to be achieved during long print runs, without the need to interrupt the continuous movement of the substrate. In this context, maintenance is understood to include analysis, inspection, cleaning and any other preventative procedure that may need to be carried out. A further advantage of such a pause is that it allows for data handling to take place. Since the printing is based on swathes, the data can be cut into small, well-defined packets for each swathe. The data for a subsequent swathe may be loaded to memory during the pause or turn-around time. Using this approach, a repeat length issue for an image is never encountered and the memory handling system may be relatively simple.

In one form of the invention, the deposition arrangement comprises a plurality of outlets or nozzles aligned generally in the transport direction of the substrate and each swathe is deposited by a subgroup of the outlets. The subgroups may comprise individual heads which may be mounted together onto the deposition arrangement or carriage in order to build up a sufficient operative length to achieve a desired deposition pattern as will be described further below. The benefits of the invention may then be achieved with a deposition head arrangement comprising a single carriage that deposits a plurality of complementary swathes.

In a particularly favourable and more versatile embodiment, the deposition arrangement comprises a plurality of carriages that can be separately driven or controlled. Each carriage carries at least one printing head. Using two heads (one on each carriage) that operate to interleave with each other, full coverage can be achieved with relative ease. Since the carriages may operate independently, the spacing between the carriages in the transport direction need not be fixed. In such an arrangement, a first head may be driven to traverse the substrate to leave a partially uncovered swathe having a length in the transport direction corresponding to a deposition width of at least one subsequent head. A subsequent head may then be driven to traverse the substrate to complete the missing swathe. In general, the swathes will be of the same width although this need not necessarily be the case. Furthermore, although two carriages are optimal for most arrangements, additional independently movable heads or carriages may also be provided to complete the coverage.

According to a most preferred embodiment, the method will comprise traversing each part of the substrate at least twice. For a particular piece of substrate it may be traversed twice by the same deposition head, or it may be traversed first by one head and then by a subsequent head. A particular advantage of this arrangement is that any individual nozzle or part of the deposition head that fails will not result in either a "vertical" failure line in the transport direction or a "horizontal" failure line in the transverse direction. Additionally, since the swathe follows a diagonal path, the fault will be at least partially spread over a larger area and may consequently be less visible.

It is envisaged that the invention will preferably be performed using an inkjet head. In this case, the method may comprise printing a plurality of individual droplets of the substance at defined locations on the substrate. As is generally known, such droplets may be carefully controlled to build up an image or matrix of dots on the substrate. In the present context, the term inkjet head is understood to define any device that can bring a plurality of small droplets or jets of fluid to individually defined precise locations on a substrate. The term is intended to encompass DoD, piezo-electric, thermal, bubble jet, valve jet, CU, electrostatic heads and MEMS systems. The system according to the invention is independent of the specific heads used, whether they be supplied by e.g. Xaar™, Fuji Film™-Dimatix™, Hewlett-Packard™, Canon™, Epson™ or Videojet™. It is for example also intended that devices are included in which drop-size is controllable, such as grey-scale print heads. Furthermore, although reference is made to inkjet, it is clearly understood that this is not intended to be restrictive upon the type of fluid jetted and that such heads may also be adapted for jetting fluids other than ink, including other colourings, finishing solutions, coatings, functional materials and the like.

According to a particular embodiment of the invention, such an inkjet device may be controlled to print individual droplets in a particular pattern on a first traverse of the substrate. On a second traverse, further droplets may be deposited at defined locations between the individual droplets of the first traverse. The complete pattern may be based on a square matrix of dots or pixels. The further droplets may be deposited at the centre of each square in order to increase the definition. Alternatively, the pattern may form a first series of lines and the further droplets may form a second series of lines between the first lines e.g. to complete a square matrix. The manner in which the droplets are deposited will depend on the desired pattern or droplet resolution. The swathe angle, defined by the relative traverse and transport speeds can be chosen to achieve this. For higher speed and lower deposition density, a greater swathe angle may be chosen. The manner in which subsequent droplets are overlaid onto the first pattern may also be chosen according to the desired resulting pattern. For a square matrix pattern, a number of alternative swathe angles are possible. Such a square dot matrix may be preferable for printing purposes in order to make use of existing image processing techniques and software. For finishing purposes, any regular matrix may be equally suitable and further patterns may be created using non-regular matrices. By varying the different parameters described above, possibly in combination with a specific inkjet head, an enormous variety of patterns, including but not limited to hexagonal and moiré patterns is possible.

In a printing embodiment of the invention the deposition arrangement may comprise a plurality of colour heads and the method then comprises traversing a head of each colour at least twice across each part of the substrate to build up a coloured image. It should thus be understood that, in general, there will be at least two heads for each colour. For a CMYK colour system this will require a total of at least eight heads. For a CMY system, six heads may be used. Preferably, the different heads will be provided together on a single carriage whereby they may traverse the substrate together. Most preferably they will be aligned with one another in the traverse direction. Building up the print carriage with multiple heads in this manner can increase its width in the traverse direction, requiring either a longer traverse or giving a narrower effective printing width.

In an embodiment of the invention where different functionalities are provided or where a functionality is built up in a number of stages, the deposition arrangement may comprise a plurality of heads, each depositing a different substance. The different deposition heads may be aligned in the transport direction. Preferably however, they will be at least partially aligned with each other in the traverse direction. The heads may be similar or may be distinct from one another, e.g. for depositing different functionalities.

In a finishing embodiment of the invention the substrate is a textile and the deposition arrangement comprises a finishing head. In this case, the method comprises applying a finishing composition to the textile. In this context, a finishing composition is understood as being a chemical that alters the physical and/or mechanical characteristics of the textile. Finishing techniques are meant to improve the properties and/or add properties to the final product. In this context, finishing may be distinguished as a species of printing by optionally defining it to exclude treatments involving deposition of materials that are applied to the substrate only because of their absorption properties at wavelengths between 400 and 700 nm or involving the recording of information. The finishing composition may be any finish appropriate for being deposited using the chosen deposition arrangement. In fact the choice of head may be selected according to the nature of the finish required. In particular, the finishing composition may be selected from the group consisting of anti-static, anti-microbial, anti-viral, anti-fungal, medicinal, non-crease, flame-retardant, water-repellent, UV-protective, anti-odour, wear-resistant, stain-resistant, self-cleaning, adhesive, stiffening, softening, elasticity-enhancing, pigment-binding, conducting, semi-conducting, photo-sensitive, photo-voltaic, light-emitting, optical brightening, shrink resistant, handle imparting, filling & stiffening, weighting, softening, oil-repellent, soil repellent, soil release, felting, anti-felting, conditioning, lustring, delustring, non-slip, moisture vapour transport, anti-snagging, anti-microbiotic, reflecting, controlled release, indicating, phase changing, hydrophilic, hydrophobic, sensory, abrasion resistant and wetting agents.

The invention also relates to a printing arrangement that may be used to implement the above described methods. As indicated above, although reference is made to a printer or printing arrangement, this is not intended to be restrictive to any particular field of use. The printing arrangement comprises a substrate transport device for continuously transporting a substrate in a transport direction, a deposition arrangement arranged to traverse across the substrate for deposition of a substance in a swathe and a control arrangement for matching a traverse speed of the deposition arrangement to a transport speed of the substrate to ensure substantially uniform coverage of the substrate by the substance. Alternatively, the control arrangement may match a traverse position of the deposition arrangement to a position of the substrate. In general, at least part of the deposition arrangement will reciprocate across the substrate, whereby deposition may take place on both passes. It is however within the scope of the invention that deposition only takes place on one of the passes. It is also possible that the return pass of the deposition arrangement takes place on a second surface of the substrate or that deposition takes place in a circumferential manner e.g. around an at least partially tubular substrate.

In a preferred embodiment, the deposition arrangement comprises a plurality of digital nozzles, each depositing individual droplets of the substance at individually defined locations on the substrate. The digital nozzle preferably forms part of an inkjet head. The term "digital nozzle" is intended to refer to a device for emitting a defined droplet from a supply of agent in response to a digital signal and depositing the droplet at a defined and controllable position. The term includes inkjet-printing heads working on both the continuous flow and drop-on-demand principles. It also includes both piezoelectric and thermal inkjet heads and encompasses other equivalent devices such as valve jets, capable of digital droplet deposition. Each nozzle may also emit a plurality of droplets together. Digital nozzles are generally well known to the skilled person in the field of graphic printing.

Most preferably, the deposition arrangement comprises a plurality of carriages. Although as described above, numerous possibilities are available using a single carriage, greater versatility may be achieved with two or more carriages. The deposition heads may then be arranged for independently traversing the substrate by mounting on carriages moving on separate beams or the like. The carriages should be spaced in the transport direction at least sufficiently to allow each to pass the other during a traverse. Preferably, the control arrangement is arranged to independently drive a pair of deposition heads in order to complement one another in depositing a uniform coverage on the substrate. For a pair of carriages, their operation will preferably take place in counter-phase. In this context, it is the swathes deposited by the heads on the carriages which are in fact in counter-phase. The phase difference of the actual movement of the carriages will depend upon their physical spacing in the transport direction.

In a further alternative embodiment, each carriage comprises a plurality of print heads, the print heads having a width in the transport direction and being spaced from one another in the transport direction by a distance corresponding to their width or a multiple thereof. It is also preferred that the nozzles of print heads on a given deposition head are aligned with one another in the transport direction. In this way, correction for overlaps and gap by swathe direction is not required. According to such an arrangement, operation of the device produces swathes in the form of stripes spaced with respect to one another by a distance corresponding to an integer multiple of the swathe width. A subsequent carriage traversing the substrate can precisely interleave with the stripes to complete the coverage. A particular advantage of such an arrangement is that individual print heads of standard form may be used and built up into a multiple head deposition arrangement. The individual heads are easily interchanged and relatively cheap compared to a single large head. Furthermore, print heads may be interchanged such that a deposition head has different print heads for depositing different substances either during the same print run or on different print runs.

In order to provide for industrial productivity, substrate speeds of up to 20 m/min may be desirable. To this end, the deposition arrangement preferably extends in the transport direction over a length corresponding to at least the width of the substrate. Where a plurality of deposition heads are provided, the total deposition length of the heads may extend over such a length. It is however understood that lower transport speeds with respect to the traverse speed may be implemented to provide greater coverage or alternative patterns of deposited droplets. Since the device is particularly suited for use with large format substrates of 1 meter width or more, the total length of all heads may also be considerable.

In a further embodiment, one or more touch-up heads may also be provided. This may be arranged to traverse across the substrate after the deposition arrangement in order to touch-up any faults in coverage. It may be mounted on a separate beam. Such a touch-up head may ensure still further increased levels of quality.

The arrangement preferably further comprises a reading device arranged to read the substrate and provide information to the control arrangement for guiding the deposition of the substance. The reading device may directly read a position or speed of movement of the substrate by following the weft. Alternatively, it may read indications printed or otherwise provided on the substrate or the transport device in the form of encoder markings or the like. It may also read the position based on prior deposited droplets. In this way, a subsequent head may be guided by e.g. the individual droplets or the edge of the swathe as deposited by a previous head. The reading of the substrate may be used to guide the speed or position of one or more of the heads or head arrangements. It may also be used to guide individual nozzles forming the heads or to guide operation of a touch-up head. Furthermore, although optical e.g. laser readers may be preferred, any other suitable reader allowing position feedback may also be employed, not limited to optical, tactile and mechanical devices.

According to a further advantageous embodiment of the invention the deposition arrangement comprises a continuous supply of the substance for deposition. In this context, a continuous supply is understood to be one that does not move with the carriage e.g. an external source. This may be pumped or otherwise supplied by appropriate tubing. Provision of an external source is useful where large quantities of substance are deposited in extended print runs. It is of course understood that the deposition arrangement may additionally include internal sources of substance traversing with the carriage, such as a small reservoir provided for particular colours or touch up.

As has been mentioned above, the invention is particularly suited to handling of large format textiles. Especially for such use, the transport device may comprise an attachment arrangement to prevent shifting of the substrate during deposition. Textiles are known to be sensitive to movement and distortion. Suitable attachment arrangements may comprise adhesive belts, vacuum, stenters and the like. It is however also within the scope of the present invention that the method may also be applied to individual items such as tiles, plates, sheets, clothing articles or the like, that are transported through the printing arrangement in a continuous manner.

The invention also relates to a continuous substrate having deposited thereon a substance, the substance being deposited as individual droplets, sequentially arranged in a plurality of diagonal swathes across the substrate, each swathe being aligned with an adjacent swathe to provide a substantially uniform coverage of the substrate. In this context, the term continuous substrate is understood to be one supplied in a length that is significantly greater than its width, as may be the case of supply from a roll or the like.

The substrate may be a textile and the substance may comprise a textile finishing composition selected from the group consisting of anti-static, anti-microbial, anti-viral, anti-fungal, medicinal, non-crease, flame-retardant, water-repellent, UV-protective, anti-odour, wear-resistant, stain-resistant, self-cleaning, adhesive, stiffening, softening, elasticity-enhancing, pigment-binding, conducting, semi-conducting, photo-sensitive, photo-voltaic, light-emitting, optical brightening, shrink resistant, handle imparting, filling & stiffening, weighting, softening, oil-repellent, soil repellent, soil release, felting, anti-felting, conditioning, lustring, delustring, non-slip, moisture vapour transport, anti-snagging, anti-microbiotic, reflecting, controlled release, indicating, phase changing, hydrophilic, hydrophobic, sensory, abrasion resistant and wetting agents. Alternatively the substrate may be a paper or card based material and the substance comprises a dye or pigment, deposited to form a predetermined pattern or image on the substrate. Other substrates may include film materials, foils, laminates such as wood-look melamine and any other material susceptible to transport in a continuous manner. In the present context the term textile may be chosen to exclude paper, carton and other substrates that are two-dimensionally stable i.e. those that are flexible in a third dimension but are only marginally deformable within their own plane. In the same context, a textile may be understood to cover a flexible substrate formed from natural or artificial fibres or yarns by weaving, knitting, crocheting, knotting, pressing or otherwise joining the fibres or yarns together, which is stretchable or otherwise deformable in its own plane.

According to a still further aspect the invention also relates to a print carriage for depositing diagonal swathes onto a moving substrate, the carriage having an axis for alignment with a movement direction of the substrate and comprising a row of print heads, each print head comprising a line of nozzles defining a swathe width, the nozzles being aligned along the axis and aligned with the nozzles of the other print heads in the row, each head being spaced from the next by a distance in the transport direction corresponding to an increment of the swathe width. The carriage may be provided with suitable mounting to allow traverse across a substrate e.g. on a beam, in a direction generally perpendicular to its axis. By providing aligned, spaced heads on a single carriage, a considerable deposition length can be achieved using otherwise conventional heads. It is not generally possible to locate two heads next to one another without leaving a gap between. This is because the extent of the nozzles from which deposition occurs is less than the length of the head. Prior designs have solved this problem by staggering adjacent heads. Such an arrangement is not however suitable for operation in a diagonal manner in two directions, since the staggered heads cannot align on both diagonal passes. By instead leaving an incremental width between swathes and depositing a comb pattern, a subsequent pass or passes may complete the missing swathes.

In a most preferred embodiment the heads are spaced by a single swathe width such that the resulting pattern deposited comprises stripes and spaces of equal width. The carriage may comprise one single row of print heads aligned along one line. Alternatively, the carriage may comprise a plurality of rows of print heads, each row being arranged to deposit a different substance. In the case of a CMYK head, four rows of heads may be provided.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

Figure 1:
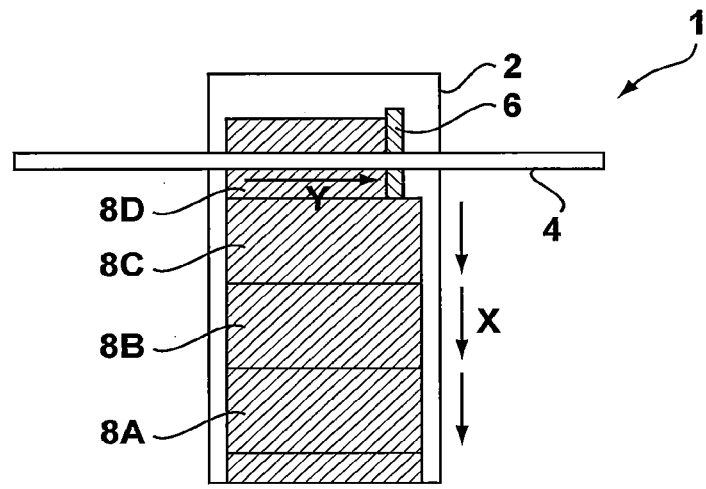
FIG. 1 is a schematic view of a conventional traverse printing arrangement.

Referring to FIG. 1, a conventional traverse print head system 1 is shown for printing onto a substrate 2 using inkjet techniques. The substrate 2 is transported in a direction X past a beam 4 on which is mounted a traversing inkjet print head 6 comprising a multitude of nozzles. In operation, the print head 6 traverses the substrate 2 in direction Y and prints a first strike 8A across the substrate having a width corresponding to the length of the print head 6. Although shown as a uniform layer, strike 8A is actually composed of thousands of tiny droplets or pixels. The substrate 2 is then moved forward an increment corresponding to the width of the strike 8A and halted. The print head 6 then traverses back across the substrate 2 to produce a second strike 8B. Further strikes 8C, 8D are performed in the same manner. In practice, variations to this procedure are carried out in which the strikes may overlap or which use interlacing and interweaving to place the individual droplets of one strike between those of another. A disadvantage of such a system is that the movement of the substrate is intermittent and high printing speeds are difficult to achieve.

Figure 2:
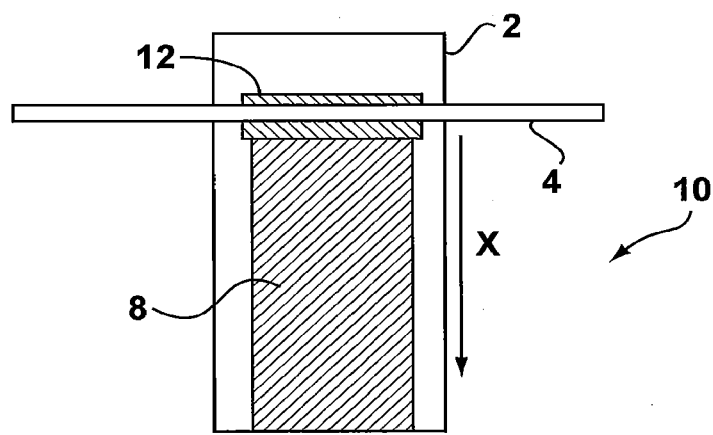
FIG. 2 is a schematic view of a conventional fixed array printing arrangement.

FIG. 2 shows a conventional fixed array printing system 10 in which a substrate 2 is transported in a direction X past a beam 4 on which a fixed head 12 is mounted. Fixed head 12 spans substantially the full width of the substrate 2. In operation, as the substrate 2 is moved, printing takes place and a strike 8 is produced over the substrate width corresponding to the width of the fixed head 12. Although this system 10 allows the substrate 2 to move continuously, frequent stoppages are necessary for preventative maintenance and repair of the head 6 or individual nozzles. Furthermore, for a given print head, only one transverse print resolution may be achieved corresponding to the nozzle spacing of the head.

Figure 3:
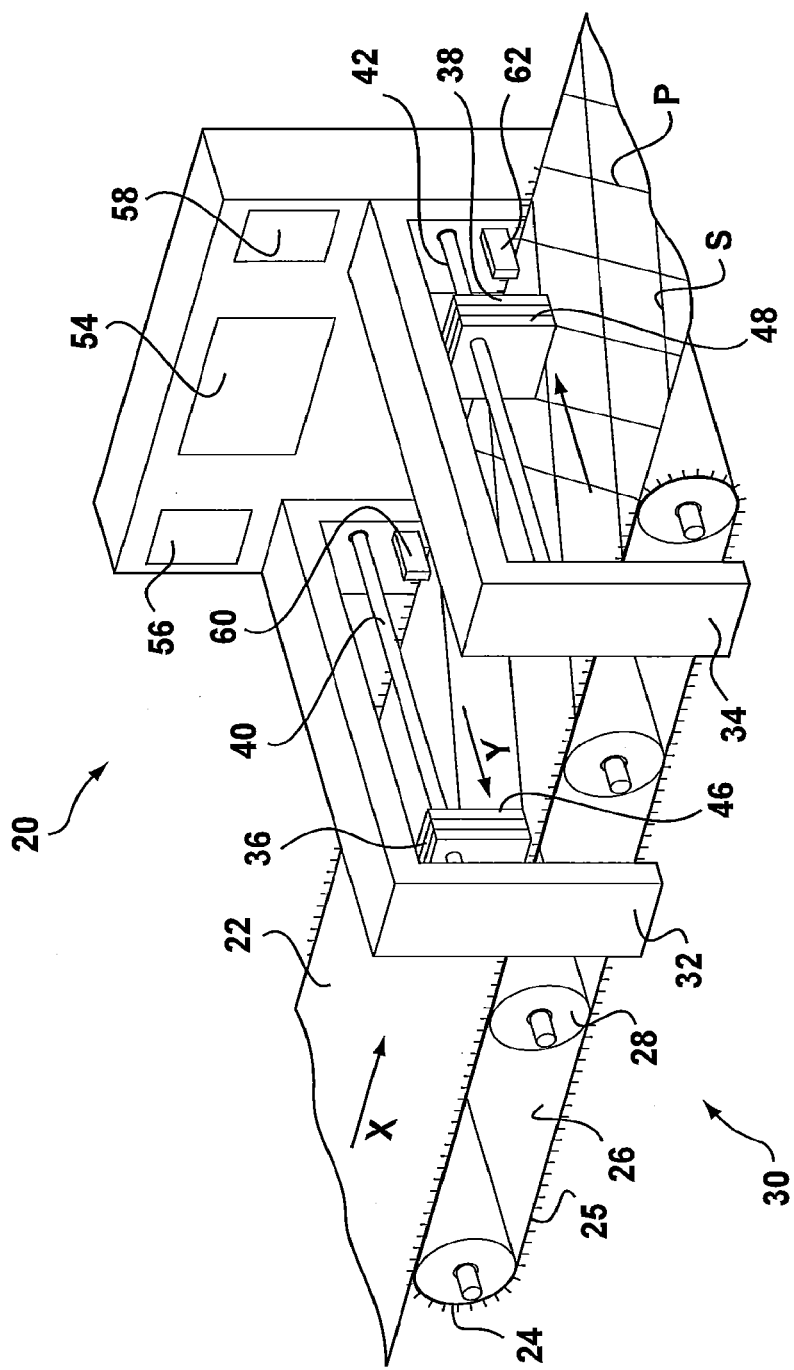
FIG. 3 is perspective view of a printing arrangement according to the present invention.

FIG. 3 shows a perspective overview of a printing arrangement 20 for printing a textile substrate 22 according to the invention. The substrate 22 is supplied from a continuous supply such as a roll or J-frame or the like (not shown) and has a width of 1.6 m. A transport arrangement 24 in the form of a conveyor band 26 driven around a number of roller elements 28 carries the substrate 22 in a continuous manner through a deposition arrangement 30 in direction X at a maximum operational speed of about 20 m/min. In order to avoid relative movement between the band 26 and substrate 22, stenter pins 25 are carried by the band 26 to retain the substrate 22. The skilled person will be aware that other appropriate attachment arrangements may be provided if desired, to temporarily retain the substrate, including adhesive, vacuum, hooks and the like.

Deposition arrangement 30 comprises a first beam 32 and a second beam 34 spanning the substrate 22. First and second carriages 36, 38 are arranged for reciprocal movement along traverse mechanisms 40, 42 across the respective beam 32, 34 in a direction Y. Movement of the first and second carriages 36, 38 is by appropriate motors (not shown) as generally used for printing carriages of this format. Carriage 36 carries a plurality of inkjet heads 46. Carriage 38 is similarly arranged with several inkjet heads 48. The inkjet heads are Xaar Omnidot™ 760 dot on demand inkjet heads having a resolution of 360 dpi and capable of producing variable drop volumes from 8 to 40 pl using grey-scale control. Each carriage 36, 38 has a total head length in the X direction of 0.8 m.

Printing arrangement 20 additionally comprises a controller 54 and ink supplies 56, 58 for the first and second beams 32, 34 respectively. The ink supplies 56, 58 may comprise individual reservoirs and pumps (not shown) for each of the heads 46, 48. In the present context, although reference is made to ink, it is understood that this term applies to any substance intended for deposition onto the substrate and that inkjet head is intended to refer to any device suitable for applying that substance in a drop-wise manner. Above the substrate 22, adjacent to beams 32, 34 are located optical encoders 60, 62, the function of which will be described below. FIG. 3 also shows primary P and secondary S swathes deposited on the substrate 22.

Operation of a deposition arrangement 30 of the type depicted in FIG. 3, will be described with reference to FIG. 4, which shows a schematic view of the deposition arrangement 30 from above, showing substrate 22, first beam 32, second beam 34, first carriage 36 and second carriage 38. For the sake of the present description, the carriages 36, 38 are considered to operate with only a single head, although it will be understood that the principle applies equally if more heads on each carriage operate.

As can be seen, carriage 36 traverses in direction Y across the substrate 22 depositing primary swathe P1 as substrate moves in direction X. As a result, swathe P1 is generally diagonal having a swathe angle α determined by the relative speeds of transport and traverse motion. In previous traverses of the substrate 22, the carriage 36 has deposited swathes P2, P3 and P4. The primary swathes P1 and P2 have overlapped in the overlap region 71. Primary swathes P2 and P3 have also overlapped in overlap region 72 as have primary swathes P3 and P4 at overlap region 73. At the point of time depicted by FIG. 4, carriage 38 traverses the substrate 22 in a direction opposite to Y depositing secondary swathe S1. In a previous traverse in the direction Y, carriage 38 has deposited swathe S2, partially overlapping with S1 in the overlap region 74.

The primary P and secondary S swathes also cross one another in the centre of the substrate 22 in crossing regions 75 and 76. As can be seen, primary P and secondary S swathes are arranged to complement one another exactly. As a result, every region of the substrate 22 is eventually passed over by two swathes: either twice by carriage 36; twice by carriage 38; or once by each of the carriages. The resulting deposition is perfectly uniform across the whole substrate.

Figure 5:
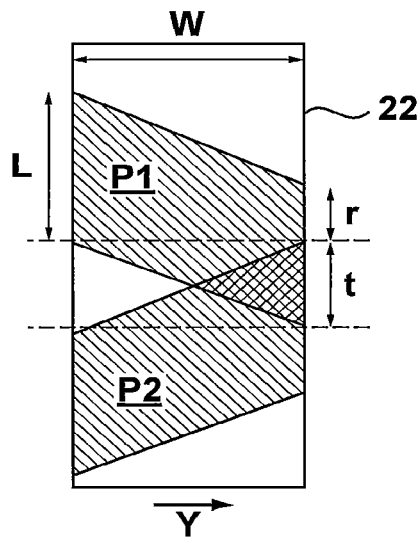
FIG. 5 is a schematic view of a portion of substrate showing deposition according to the invention.

FIG. 5 discloses in further detail the manner in which the individual swathes P1, P2 are set down onto the substrate 22 which has a width w. Details of the deposition arrangement 30 have been omitted for the sake of clarity. In a first traverse in direction Y, swathe P2 has been deposited. During the traverse, substrate 22 moves a transport distance t with respect to the carriage in the transport direction X. The carriage 36 then passes beyond the edge of the substrate 22 where maintenance is performed off-line during a pause in its movement. During this pause, the nozzles of the inkjet head are all fired and the face plate of the head is wiped clean of residue. The time taken for turn around of the carriage 36 is approximately 2 s. During this time, the substrate 22 advances further in the direction X by a rest distance r. By choosing t and r to correspond to the head length l of carriage 36, the space between successive swathes in the same direction P1, P3 will correspond to the width of a swathe—and to the width of subsequent carriage 38, given that both carriages deposit the same width. This corresponds to the case where the width of a swathe is equal to half of the period of the cycle of operation of the deposition arrangement 30. By operating the second carriage 38 in counter-phase with the first carriage 36, uniform coverage of the substrate 22 is achieved.

Figure 4:
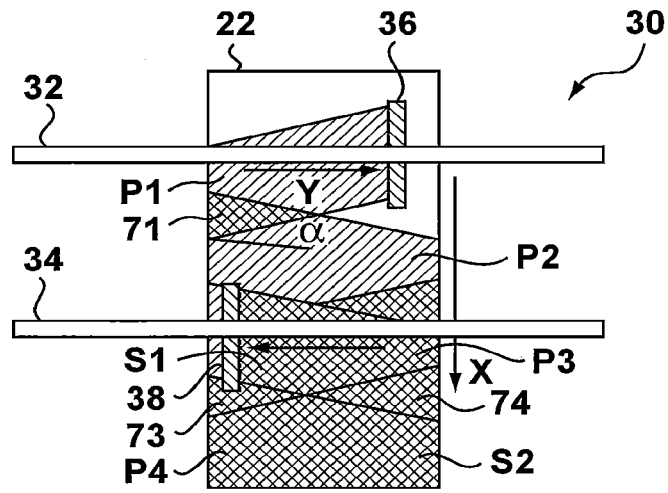
FIG. 4 is a schematic view of a deposition arrangement according to the invention.

According to the embodiment described in relation to FIGS. 4 and 5, the deposition arrangement may operate at different swathe angles α, subject to the print width being equal to the sum of the transport distance t and the rest distance r (or a multiple thereof). For many practical purposes however, it is desirable that the individual droplets are deposited with great accuracy at chosen locations in a matrix pattern. This can be important for printing or imaging purposes but may also be of great significance in producing textiles with advanced functionality. Each of the nozzles forming the ink jet heads is individually controllable by controller 54. By driving the carriages 36, 38 in a particular manner, a regular matrix pattern on the substrate can be achieved as will be described in relation to FIG. 6.

Figure 6:
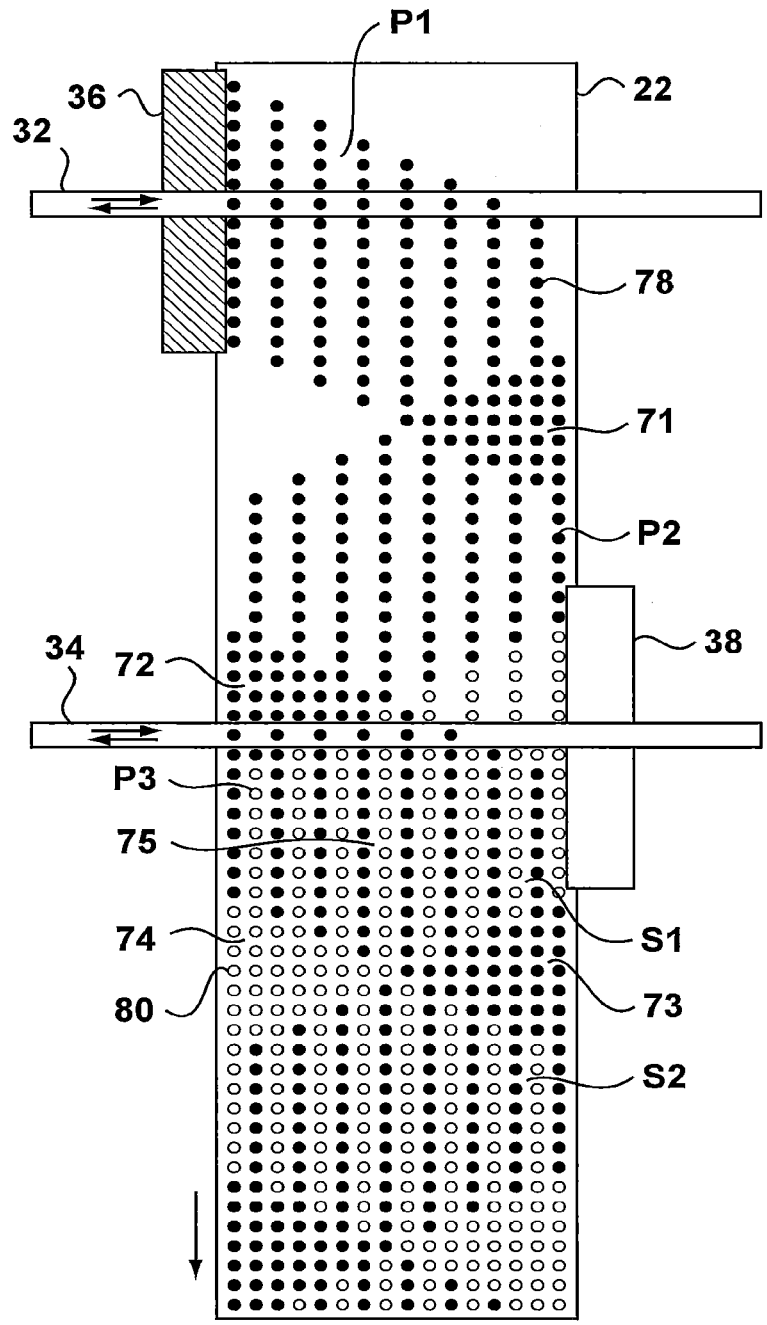
FIG. 6 is a detailed schematic view of the deposition arrangement of FIG. 4.

FIG. 6 shows a similar schematic plan view of the deposition arrangement 30 to that of FIG. 4 in which like reference numerals define like features. In FIG. 6 however, the individual droplets 78, 80 deposited by the inkjet nozzles of carriages 36, 38 are shown at exaggerated scale. Carriage 36 is off-line at the edge of substrate 22 after completing swathe P1 in which a series of lines of droplets 78 have been deposited at a horizontal resolution of 180 dpi and a vertical resolution of 360 dpi corresponding to the nozzle spacing. This represents the situation where the traverse velocity is double that of the transport velocity. In a previous swathe P2, the droplets 78 were offset from those of P1 by half of the horizontal resolution. In overlap region 71, the droplets 78 are interlaced with one another to complete a square matrix at 360 dpi. Similar overlap applies in overlap regions 72 and 73. Carriage 38 is off-line at the edge of the substrate 22 after completing swathe S1 comprising a plurality of individual droplets 80. In the crossing region 75 with swathe P3, the droplets 78 and 80 are interlaced to achieve the same square matrix pattern at 360 dpi. In overlap region 74, droplets 80 from swathes S1 and S2 are interlaced. Appropriate control of the nozzles of the heads of first and second carriages 36, 38 allows drop on demand delivery to each node or pixel location of the complete substrate with a resolution of 360 dpi. This may be achieved at continuous printing speeds of 20 m/min or higher for substrates of widths of 1.6 meters or more. Importantly also, the system allows periodic maintenance without stopping the continuous transport of the substrate.

As shown in FIG. 3, each beam 32, 34 carries its own optical encoder 60, 62. The encoders 60, 62 read the substrate 22 and determine the movement thereof. The position of the substrate 22 is continuously fed back to the controller 54 and used to determine the required movement and position of the carriages 36, 38. By operating the substrate and carriages in a master-slave relationship, accurate drop placement can be achieved even if the speed of the substrate 22 is not constant. The carriages 36, 38 are thus driven independently of one another and accurate printing can still take place if the substrate 22 were to slip between the beams 32, 34. This arrangement also allows the speed of the substrate to be varied up to its maximum speed in a continuous manner, whereby the speed of traverse of the carriages increases in unison. This is extremely important in the context of industrial scaling where it may be desired to perform start-up and shut-down in a gradual manner or where it may be needed to slow the process while another action takes place.

Figures 7, 7A, 7B:
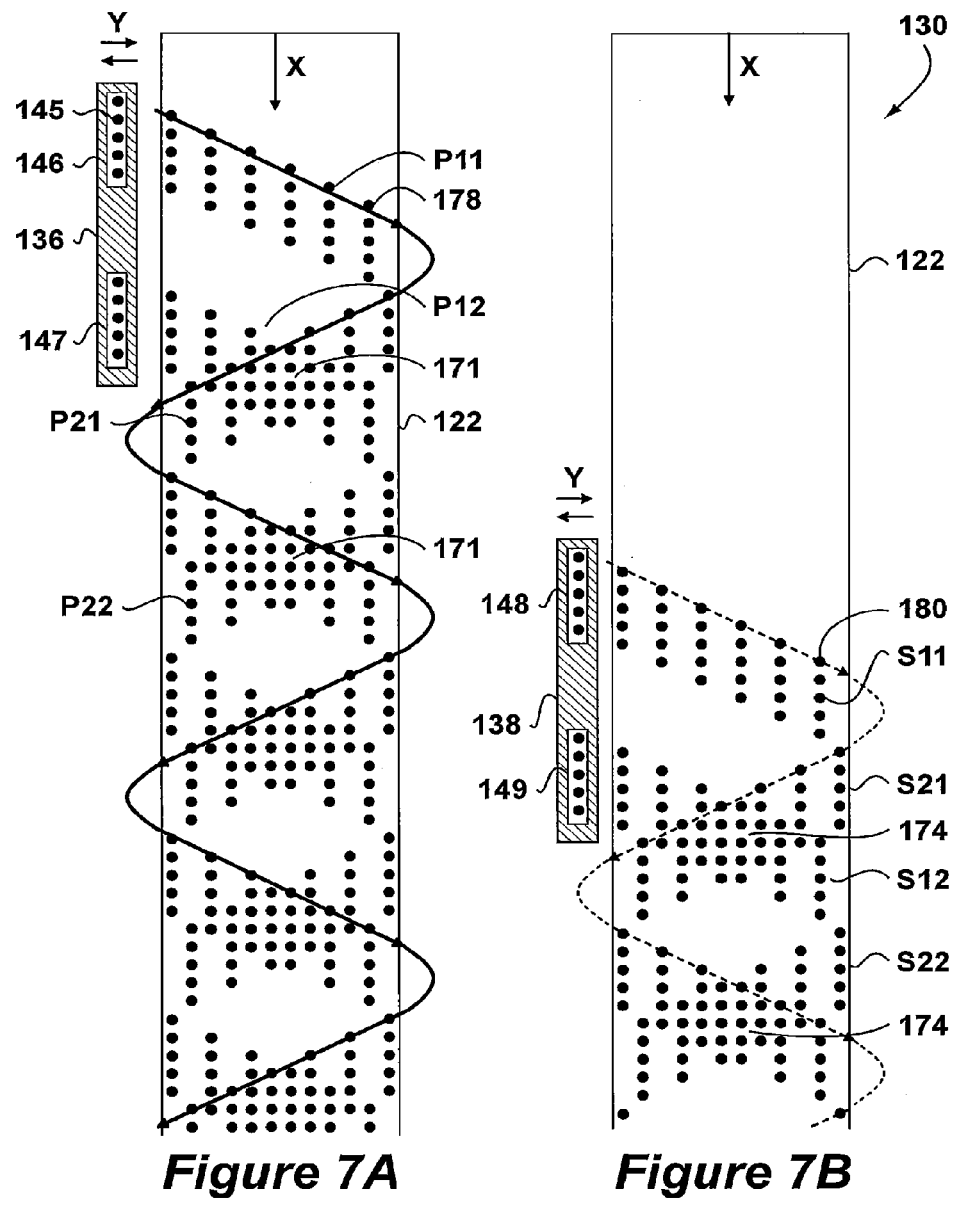
FIG. 7 is a detailed schematic view of an alternative deposition arrangement according to the invention.
Figure 8:
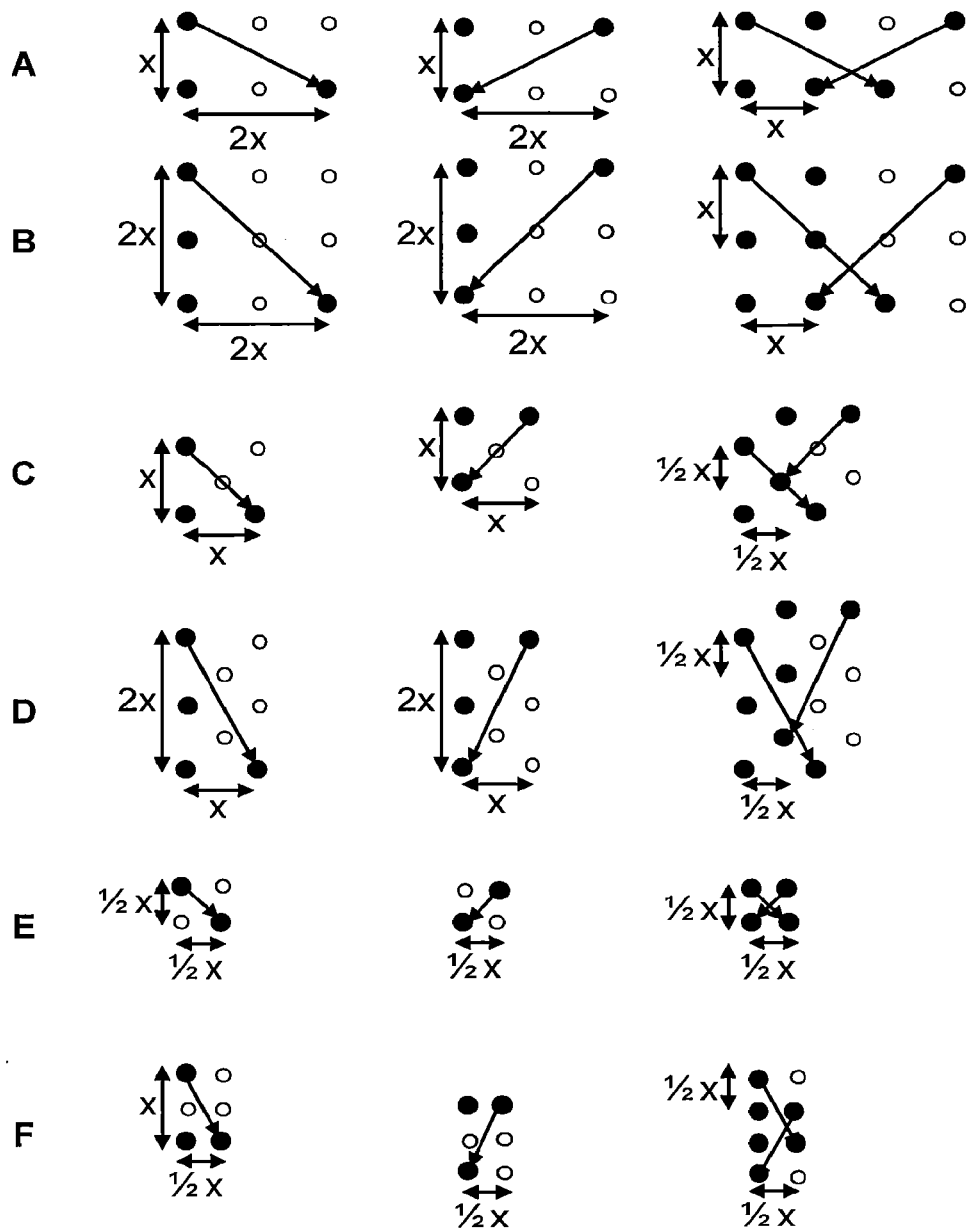
FIGS. 8A-F depict alternative square matrix arrangements produced according to the invention.

An alternative embodiment of a print head arrangement 130 according to the present invention is shown in FIG. 7 in which like reference numerals preceded by 100 define like features. For better visualisation, FIG. 7A shows the deposition onto substrate 122 by the first carriage 136 and FIG. 7B shows the deposition onto the substrate 122 by the second carriage 138. Further details of the deposition arrangement 130 have been omitted for the sake of clarity but are understood to be otherwise the same as in FIG. 3.

As can be seen from FIG. 7, carriage 136 comprises two inkjet heads 146, 147. The inkjet heads 146, 147 are aligned with one another in the transport direction X and are spaced from another exactly the same distance as the length of each of the heads 146, 147. Each head 146, 147 comprises a plurality of nozzles 145, of which for the sake of clarity only five are shown. In actual fact, inkjet heads 146, 147 are Xaar Omnidot™ 760 DoD inkjet heads having 382 nozzles aligned in the transport direction at a resolution of 360 dpi. Carriage 138 also comprises two inkjet heads 148, 149, arranged in the same manner with the same spacing between them.

In use, carriage 136 traverses in a first direction across the moving substrate 122 to deposit primary swathes P11 and P12 by heads 146, 147 respectively. The nozzles 145 are fired to deposit a series of lines of droplets 178 at a horizontal resolution of 180 dpi and a vertical resolution of 360 dpi corresponding to the nozzle spacing. This again requires that the traverse velocity is double that of the transport velocity. The swathes P11, P12 are arranged to interlace with previous swathes P21, P22 deposited in an immediately previous traverse at the same resolution. As can be seen, in overlap regions 171, the deposited droplets 178 form a square matrix at a resolution of 360 dpi. Carriage 138 is also driven in a similar manner to deposit droplets 180 in swathes S11, S12, S21 and S22 having overlap regions 174. The swathes deposited by carriages 136 and 138 are completely complementary in shape and, deposited one after the other onto the same substrate 122 produce a uniform coverage of the whole substrate in a square matrix with a resolution of 360 dpi.

By spacing the heads one head width apart, the primary and secondary swathes are deposited in an interleaved comb pattern. An advantage of this arrangement according to FIG. 7 is that further heads can be arranged on each carriage to increase the total length of the head structure. It is however difficult to arrange heads immediately adjacent to one another due to mechanical considerations at the end of each head. By allowing a full head width between adjacent heads, a uniform and complete coverage is nevertheless achieved. If individual heads fail, they may be replaced without requiring the whole head structure to be exchanged.

The skilled person will immediately be aware of the alternative resolutions and matrix arrangements that may be deposited according to the principles of the present invention. As an example of such alternatives, FIGS. 8A-F depict six square matrix arrangements showing different relative traverse and transport velocities giving different resolutions. The first column of matrices represents deposition in a first traverse, the second column represents deposition in a second traverse and the third column represents the manner in which the two depositions may be combined to complete the matrix.

In the disclosed embodiments, the carriages pause for maintenance after each traverse. It will however be understood that maintenance need only be performed after a full cycle or after several cycles. In that case, two heads or carriages could be arranged on a single beam to traverse together, each from one edge to the middle of the substrate, with maintenance being performed only at the edges.

Thus, the invention has been described by reference to certain embodiments discussed above. It will be recognized that these embodiments are susceptible to various modifications and alternative forms without departing from the spirit and scope of the invention. Accordingly, although specific embodiments have been described, these are examples only and are not limiting upon the scope of the invention.

What is claimed is:

1. A printing arrangement, comprising:
a substrate transport device for continuously transporting a supply of textile substrate in a transport direction, wherein the substrate transport device comprises an attachment arrangement to prevent shifting of the textile substrate with respect to the substrate transport device during transporting;
a deposition arrangement comprising one or more carriages, each carriage comprising a plurality of print heads arranged to deposit the same substance, the deposition arrangement being arranged to traverse across the textile substrate for deposition of the substance in one or more diagonal swathes during the movement of the substrate in the transport direction, each swathe having a width corresponding to a width of a print head; and
a control arrangement for synchronising a traverse speed or position of the deposition arrangement to a transport speed or position of the substrate to ensure that swathes complement each other to provide substantially uniform coverage of the substrate by the substance.

2. The arrangement according to claim 1, wherein the deposition arrangement comprises a plurality of carriages.

3. The arrangement according to claim 2, wherein each carriage has a drive arrangement for independently traversing the substrate.

4. The arrangement according to claim 3, wherein the control arrangement is arranged to drive a pair of carriages to operate in counter phase in order to complement one another in depositing a uniform coverage on the substrate.

5. The arrangement according to claim 2, wherein the print heads on each carriage are spaced from one another by a distance in the transport direction corresponding to their width.

6. The arrangement according to claim 3, wherein each carriage comprises a plurality of print heads, the print heads being aligned with one another in the traverse direction and each of such heads is arranged to deposit a different substance.

7. The arrangement according claim 1, wherein the substrate transport device has a width to receive the substrate and the deposition arrangement extends in the transport direction over a length corresponding to at least the width.

8. The arrangement according to claim 1, further comprising a reading device arranged to read the substrate and provide information to the control arrangement for guiding the deposition of the substance.

9. The arrangement according to claim 1, wherein the deposition arrangement comprises an inkjet head for printing a plurality of individual droplets of the substance at defined locations on the substrate.

10. The arrangement according to claim 1, wherein the deposition arrangement comprises a continuous supply of the substance.

\* \* \* \* \*